（12) United States Patent
Rocourt et al.

(10) Patent No.: US 8,226,138 B2
(45) Date of Patent: Jul. 24, 2012

(54) APPARATUS FOR SECURING RESCUE OPERATIONS BY HELIHOISTING

(75) Inventors: Jean-Louis Rocourt, Saint Nazaire les Eymes (FR); Alain Maurice, Saint Hilaire du Touvet (FR); Paul Petzl, Barraux (FR)

(73) Assignee: Zedel, Crolles (FR)

( * ) Notice: Subject to any disclaimer, the term of this patent is extended or adjusted under 35 U.S.C. 154(b) by 0 days.

(21) Appl. No.: 12/934,130

(22) PCT Filed: Mar. 26, 2009

(86) PCT No.: PCT/FR2009/000335
§ 371 (c)(1),
(2), (4) Date: Sep. 23, 2010

(87) PCT Pub. No.: WO2009/130404
PCT Pub. Date: Oct. 29, 2009

(65) Prior Publication Data
US 2011/0042984 A1    Feb. 24, 2011

(30) Foreign Application Priority Data
Mar. 26, 2008  (FR) .................................... 08 01638

(51) Int. Cl.
*B66C 1/38*    (2006.01)
(52) U.S. Cl. .................................................. 294/82.34
(58) Field of Classification Search ............... 294/82.24, 294/82.25, 82.31, 82.33–82.36
See application file for complete search history.

(56) References Cited

U.S. PATENT DOCUMENTS

| 1,576,197 | A | | 3/1926 | Kuffel et al. | |
| 2,736,599 | A | * | 2/1956 | Coffing | 294/82.31 |
| 2,852,217 | A | | 9/1958 | Engelhardt | |
| 3,218,100 | A | * | 11/1965 | Bendi | 294/82.34 |
| 3,239,266 | A | * | 3/1966 | Elliott | 294/82.33 |
| 3,533,655 | A | | 10/1970 | Harley | |
| 4,379,579 | A | | 4/1983 | Mahan et al. | |
| 4,441,750 | A | * | 4/1984 | Reber | 294/82.24 |
| 4,471,511 | A | | 9/1984 | Phipps | |
| 5,100,192 | A | * | 3/1992 | McMillan | 294/82.31 |

FOREIGN PATENT DOCUMENTS

| BE | 763926 | 3/1971 |
| EP | 0 089 172 A2 | 9/1983 |

OTHER PUBLICATIONS

International Search Report issued in Application PCT?FR2009/000335; Dated Sep. 30, 2009 (With Translation).

* cited by examiner

*Primary Examiner* — Dean Kramer
(74) *Attorney, Agent, or Firm* — Oliff & Berridge, PLC (57) ABSTRACT

The invention relates to an apparatus for securing rescue operations by helihoisting that comprises three attachments to the helicopter, the lifeguard and the belay tether. A trigger control mechanism includes a mobile pawl pivotally mounted on the hook between a closing position and a release position of the opening, respectively for maintaining the tether in the hook and for releasing the same, and a latch submitted to the action of a polarisation spring for locking the pawl in the closed position in the absence of a tension on the first attachment, and for unlocking the pawl when the force applied on the first attachment exceeds that of the polarisation spring. The assembly is arranged for triggering the automatic release of the belay tether that remained attached when the tensioning by the helicopter traction cable exceeds a predetermined threshold.

8 Claims, 8 Drawing Sheets

APPARATUS FOR SECURING RESCUE OPERATIONS BY HELIHOISTING

BACKGROUND OF THE INVENTION

The invention relates to an apparatus able to be carried by a lifeguard or mountain rescuer for rescue operations performed by helihoisting. The apparatus is designed for rescue operations in hazardous environments, at sea or in the mountains, requiring the intervention of a helicopter.

STATE OF THE ART

The usual procedure during mountain rescue operations used to prohibit attachment of the helicopter cable to the harness of a lifeguard at the same time attached to the rock face. At present, operations are sometimes performed in very dangerous locations. Lifeguards have to constantly ensure their own safety and that of the people they are rescuing. This is why this prohibition has little by little fallen into abeyance. This results in the most dangerous moment of a helihoisting operation occurring when the helicopter is secured to the rock face by the lifeguard's belay lanyard, as the helicopter then no longer disposes of its freedom of movement. This dangerous attachment is established via a mountain rescuer who is forced to attach his harness to the rock face and at the same time to the helicopter hoisting winch on account of the verticality of the location. At this precise moment, if turbulence shakes the helicopter or if hoisting begins before the attachment to the rock face has been deliberately removed, the helicopter, its crew and the personnel operating on the mountainside risk a fall which may be fatal.

This is why ropes severed in haste and ripped-off or deformed attachments are countless, as is deliberate severing of the hoisting cable which a last-resort pyrotechnical device severs to release the helicopter from the grip of the mountainside. But the helicopter crew has to press the control button causing this releasing at the right moment without knowing exactly what the result will be.

The document U.S. Pat. No. 3,533,655 relates to a device for automatic release of a load suspended on a helicopter cable. Release of the load is achieved by a deliberate releasing action of a fastening means.

The documents U.S. Pat. No. 2,852,217 and BE 763926 describe suspension systems with automatic release of the load when the latter reaches the ground.

The above-mentioned devices with two attachment strands and automatic or manual release of the load are not suitable for securing rescue operations by helihoisting where the load is constituted by a rescuer who must not be detached on any account.

OBJECT OF THE INVENTION

The object of the invention consists in providing a device for securing rescue operations by helihoisting designed to make operating methods progress and to increase the possibilities of performing operations, due to enhanced safety for personnel and the equipment involved in rescue operations.

The apparatus is characterized in that it comprises a hook having first attachment means to a cable of a helicopter, second attachment means for the load, third attachment means for a belay lanyard housed in a downward-facing aperture, and a control mechanism designed to trigger automatic release of the belay lanyard that has remained attached when tensioning by traction of the helicopter cable exceeds a predetermined threshold.

If the helicopter exerts a predefined traction on the belay lanyard that remains attached to the rock face, detachment becomes automatic and releases the helicopter instantaneously.

The three attachment means enable eight possible configurations. The truth table below studies each configuration.

| H | L | T | |
|---|---|---|---|
| 0 | 0 | 0 | the apparatus is not in use |
| 1 | 0 | 0 | the apparatus is suspended on its own under the helicopter (of no interest) |
| 0 | 1 | 0 | the apparatus is attached to the lifeguard's harness (awaiting hoisting) |
| 1 | 1 | 0 | the lifeguard suspended is underneath the helicopter via the apparatus |
| 0 | 0 | 1 | the apparatus is suspended via its lanyard (awaiting operation) |
| 1 | 0 | 1 | the helicopter is pulling on the lanyard (without load): the apparatus releases the lanyard |
| 0 | 1 | 1 | smooth vertical rock face, the lifeguard is suspended on the lanyard via the apparatus which belays him: impossible to release the lanyard |
| 1 | 1 | 1 | the helicopter hoists the lifeguard (or a load) via the apparatus and pulls on the lanyard that has remained attached: the apparatus releases the lanyard |

H = Helicopter
L = Lifeguard
T = Lanyard
Logic state 0 (zero) designates a lack of tensioning (load, weight, force, etc. non-existent).
Logic state 1 (one) designates tensioning (load, weight, force, etc. applied).

Release of the belay lanyard that has remained attached to the rock face is only performed automatically if:
manual detachment is not performed,
the helicopter is hoisting and is in danger.

If there is no attachment to the helicopter, automatic detachment of the lanyard is rendered impossible by the mechanical latching of the mechanism.

According to the invention, the control mechanism of the apparatus is composed of:
a mobile pawl mounted pivotally on the hook between the closed and released positions of said aperture to respectively maintain the lanyard in the hook and to release the latter therefrom,
and a latch submitted to the action of a polarisation spring to latch said pawl in the closed position in the absence of tension on the first attachment means, and to unlatch said pawl when the force exerted on the first attachment means exceeds that of the polarisation spring.

According to a first embodiment, the belay lanyard is secured in the aperture of the hook by the pawl which can release the aperture by pivoting around a spindle joining the hook and pawl. The pawl is provided with a hole receiving the second means for attaching the load (lifeguard, etc.). The hook is provided with an oblong curved aperture the mean radius of curvature whereof is the arc of a circle centred on the pivoting axis of the pawl spindle. This oblong curved aperture receives the attachment means of the load jointly with the hole of the pawl; it allows free rotation of these attachment means around the spindle and limits the amplitude of rotation of the pawl by acting as stops. The hook comprises another oblong aperture, which is straight, receiving the first attachment means to the helicopter, for example a shackle. The spindle of the shackle is inserted in a guide tube sliding in the straight oblong aperture. The position of this tube, at the bottom of the oblong aperture (always with respect to the vertical), is imposed by a spring surrounding the tube. The spring bears on stops securely affixed to the hook. The tube, and the spring strained by a stress, are simultaneously mobile in the straight oblong aperture. The action of this spring consists in keeping the tube at the bottom of the straight oblong aperture in such a way that the pivoting pawl is engaged against the stop formed thereby when the pawl is closed. A latch is thus formed keeping the pawl in the closed position.

When the lanyard is attached to a fixed point without any load suspended on the apparatus, traction of the helicopter on the shackle causes: tensioning of the lanyard; simultaneous sliding of the shackle, guide tube and spring in the straight oblong aperture; unlatching of the pawl, which has become free to pivot; opening of the pawl by tensioning of the lanyard, tensioned by the sole traction exerted by the latching spring; and detachment of the lanyard. The apparatus remains suspended from the helicopter released from any obstruction. The latch reverts to its position at the bottom of the straight oblong aperture. The pawl remains open.

When the lanyard is attached to a fixed point with a load suspended on the apparatus, traction of the helicopter on the shackle causes: simultaneous sliding of the shackle, guide tube and spring in the straight oblong aperture (due to the weight of this load); unlatching of the pawl, which has become free to pivot, but which is still held in the closed position by the weight of the suspended load; hoisting of the load; tensioning of the lanyard; opening of the lanyard by the traction of the tensioned lanyard; and detachment of the lanyard. The apparatus and its load remain suspended from the helicopter released from any obstruction. The latch remains in its top position and the pawl closes under the weight of the suspended load.

According to a second embodiment, the pawl is connected to the second attachment means by a link with an eccentric which supports the second attachment means, the pivoting spindle of the pawl passing through the latter. The pawl comprises a protuberance operating in the latched position in conjunction of the latch with a mechanical link securedly affixed to the first attachment means.

According to a third embodiment, the hook comprises:
a circular first hole for the second attachment means of the load,
a second hole for fitting the spindle of a pivoting clamp forming the first attachment means to the hoisting cable of the helicopter,
and a slide rack commanding the latch, which is formed by the bottom end of a rod of the rack, and a protuberance of the pawl.

The slide rack is provided with a cross-bar subjected to the action of two compression springs bearing on a fixed stop of the body. An auxiliary spring is advantageously inserted inside the body between a lateral extension of the stop and a ball-bearing pressing on the pawl, said ball-bearing operating in conjunction with a convex guide ramp to keep the pawl in the closed position without obstructing triggering.

DETAILED DESCRIPTION OF THE INVENTION

Figure 1:
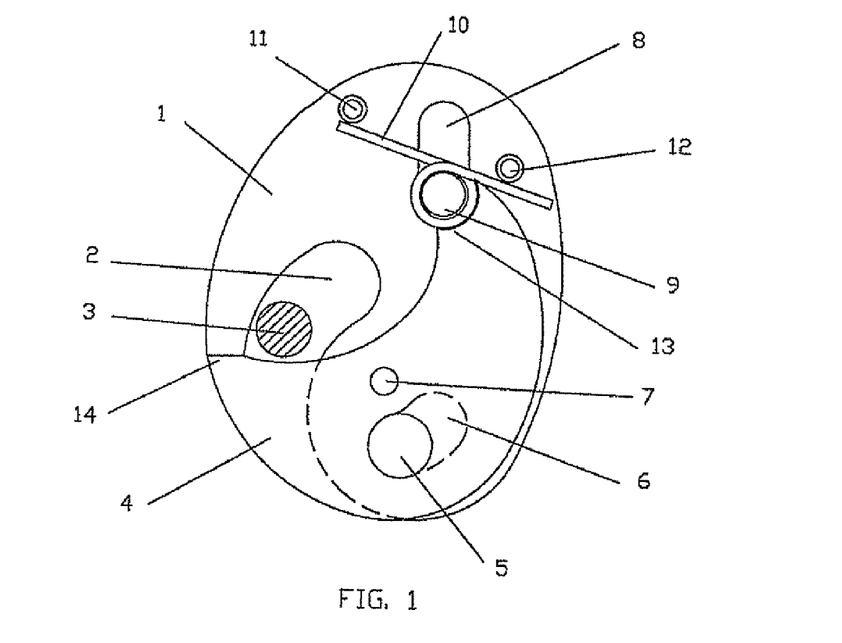
FIG. 1 represents a schematic view of the apparatus according to the invention when the latter is in the rest state without any outside stress solicitation.

With reference to FIG. 1, the apparatus according to the invention is not subjected to any external stress (H=0, L=0, T=0 of the truth table). It comprises a hook 1 which receives a belay lanyard 3 in an aperture 2, and a mobile pawl 4 wherein a hole 5 is drilled to be able receive the attachment means of the load (for example a carabiner). A first curved oblong aperture 6 is arranged in the body of hook 1 to receive the attachment means to the load simultaneously with hole 5.

Pawl 4 is mounted with limited pivoting on a spindle 7 of hook 1 with an angular travel enabling belay lanyard 3 to be detached. A straight second oblong aperture is arranged at the top part of the body to house a guide tube 9 receiving the attachment means to the helicopter (for example a shackle).

Around this tube 9, a torsion spring 10 bears on hook 1 by means of stops 11 and 12. The end of pawl 4 comprises a concave bearing surface 13 so as to come up against the stop formed by cylindrical guide tube 9 in the rest position (FIG. 1). The assembly formed by tube 9 and bearing surface 13 constitutes a latch V1 preventing pawl 4 from opening. Belay lanyard 3 cannot be lost, nor can it be detached.

The two stops 11, 12 represented as bearing point for spring 10 at the same time constitute two of the assembly means of the plates of hook 1.

Figure 2:
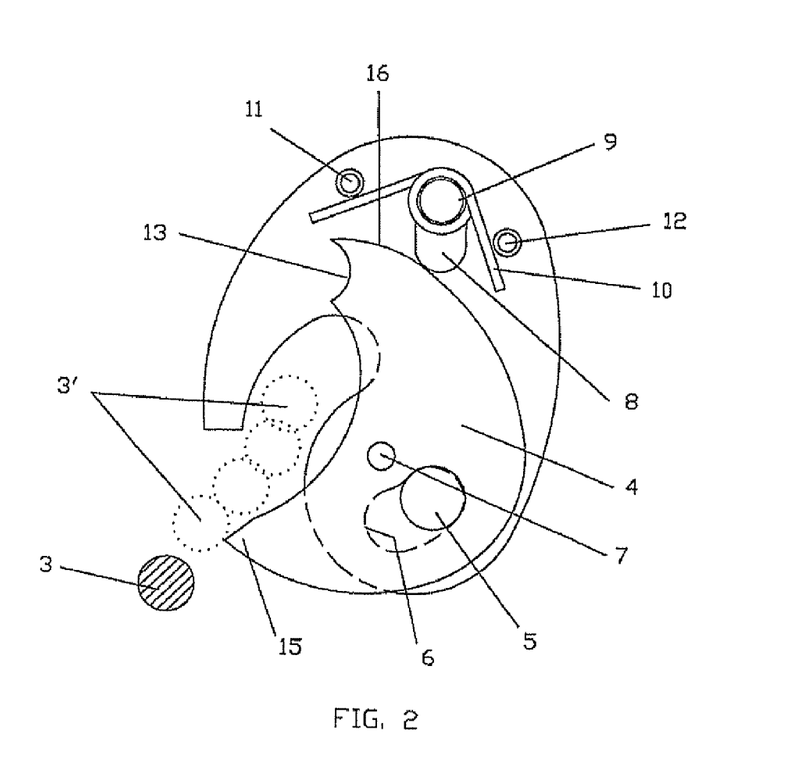
FIG. 2 is an identical view to FIG. 1 when the apparatus is stressed to cause detachment of the lanyard.

In FIG. 2, the apparatus is subjected to the forces that lead to detachment of belay lanyard 3 (H=1, L=0 or 1, T=1 of the truth table). When hoisting the load attached to 5, the helicopter pulls upwards on guide tube 9 to make the latter slide in second oblong aperture 8. Bearing surface 13 escapes from tube 9 resulting in unlatching of latch V1 and release of pawl 4. The apparatus and load start to rise by helihoisting. Belay lanyard 3, which has not been detached beforehand from the rock face by the rescuer, tenses between its point of attachment to the rock face and pawl 4. The lanyard takes the successive positions represented in broken lines (3') causing opening of the unlatched pawl 4 which detaches belay lanyard 3. Pawl 4 then recloses due to the weight of the load.

If the load is a rescuer, he can insert a new lanyard 3 in the apparatus by means of aperture 2 which enables a lanyard to be inserted folded double.

If no load is suspended on the apparatus, hoisting tenses lanyard 3 on its attachment point (rock face). Unlatching of pawl 4 takes place as soon as the tension of lanyard 3 exceeds the action of spring 10. Pawl 4 opens and detaches lanyard 3. Pawl 4 then remains open, as spring 10 forces tube 9 to the bottom of second oblong aperture 8 and nothing activates pawl 4 to the closed position.

Figure 3:
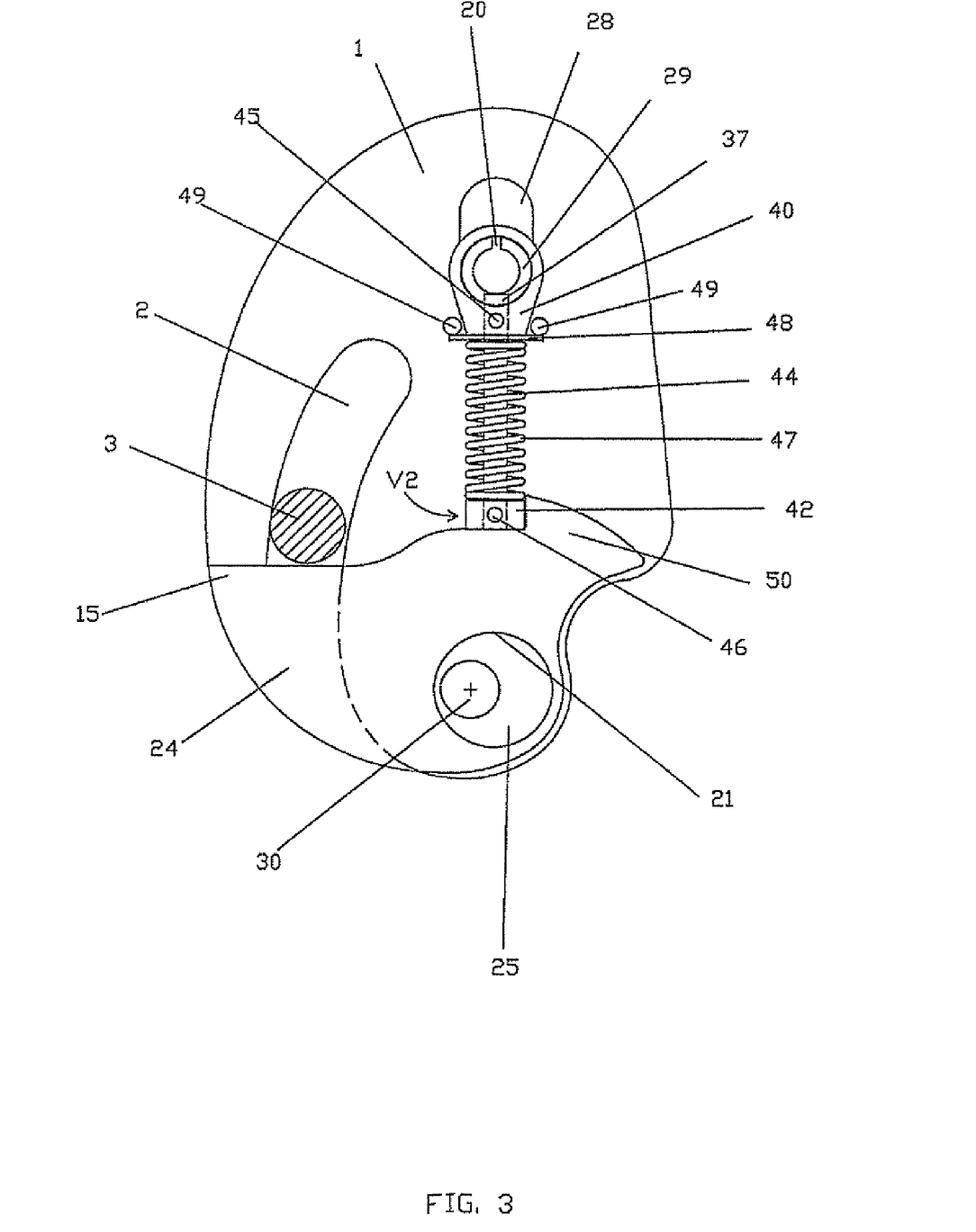
FIG. 3 shows an identical view to FIG. 1 of an alternative embodiment, the apparatus being in the rest state.

With reference to the alternative embodiment of FIG. 3, the apparatus is at rest. It is not subjected to any external stress (H=0, L=0, T=0 of the truth table).

Hook 1 as previously receives belay lanyard 3 in aperture 2. Pawl 24 is fixed on an eccentric 25 by an assembly means (not shown). A spindle 30 passes through the assembly formed by hook 1, pawl 24 and eccentric 25. Pawl 24 and eccentric 25 can pivot through an angle enabling belay lanyard 3 to be detached. Eccentric 25 supports the attachment means to the load. This load is applied on eccentric 25 in the vertical direction passing via the centre of the large circle 21.

Second oblong aperture 28 acts as housing for a guide tube 29 receiving the first attachment means to the helicopter. (for example a shackle or a hasp). Guide tube 29 is immobilised in rotation by a rod 37. A slit 20 constitutes the fixed point of a spring enabling the shackle or hasp to fold back against the body of the apparatus.

A sensor 40 surrounds guide tube 29 and is connected to a latch 42 by a connecting rod 44 which is fixed to sensor 40 by a cotter-pin 45 or other equivalent means. Connecting rod 44 is fixed to a stud 42 of a latch V2 by another cotter-pin 46. A compression spring 47 surrounds connecting rod 44 coaxially and bears via one of its ends on a plate 48 connected to hook 1 by stops 49. Plate 48 constitutes the fixed point of spring 47 which presses via its opposite end on latch stud 42.

Stud 42 of latch V2 acts in the rest position on a protuberance 50 of pawl 24 to prevent the latter from opening. Belay lanyard 3 can be neither lost nor detached.

Figure 4:
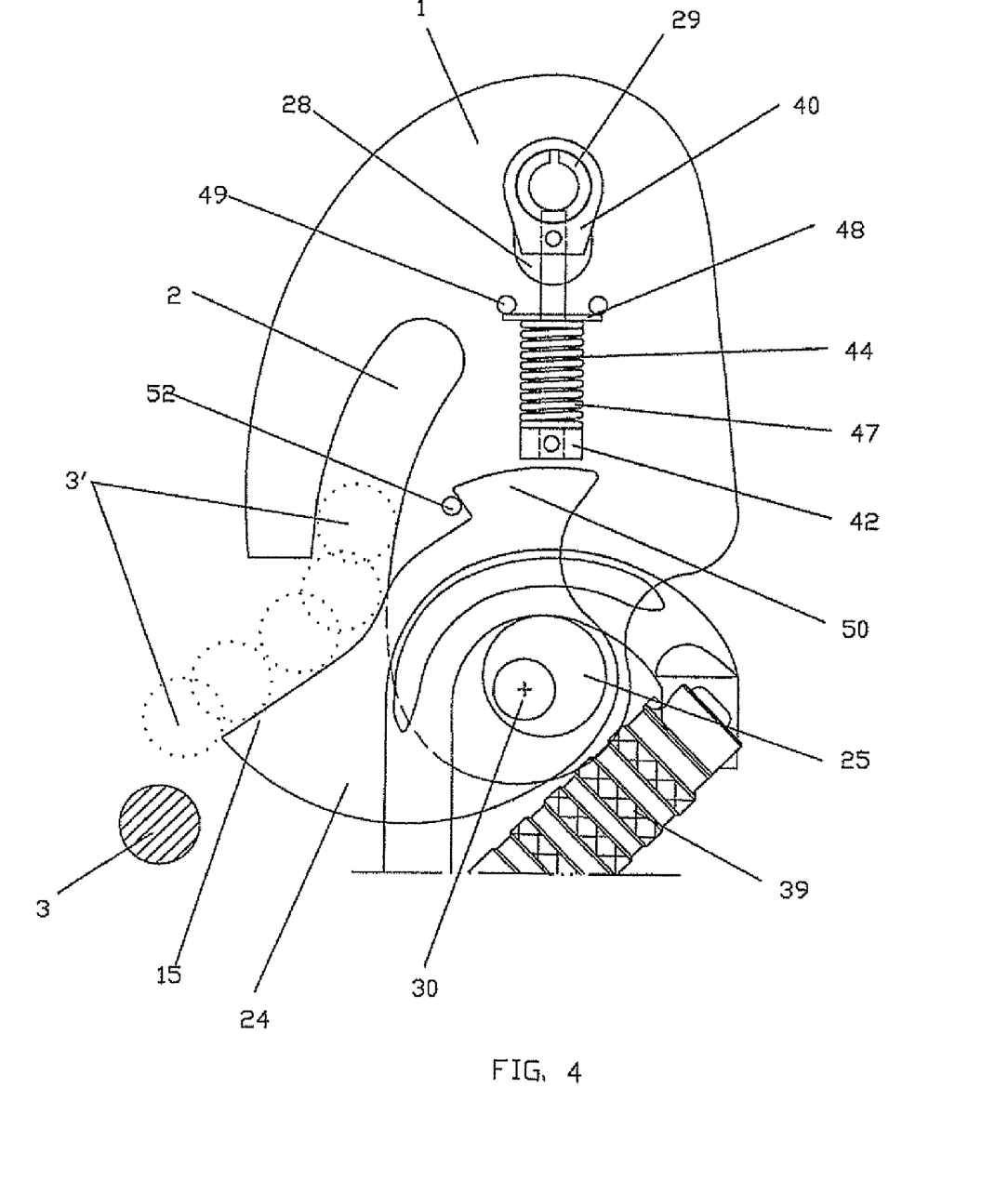
FIG. 4 is an identical view to FIG. 3, when the apparatus is stressed to cause detachment of the lanyard.

In FIG. 4, the apparatus of FIG. 3 is stressed by the forces which lead to detachment of belay lanyard 3 (H=1, L=0 or 1, T=1 of the truth table).

When hoisting the load supported by eccentric 25, for example by means of a carabiner 39, the helicopter pulls on guide tube 29 by means of a shackle (not shown). Tube 29, sensor 40, connecting rod 44 and latch 42 slide upwards compressing spring 47. Latch 42 releases protuberance 50 of pawl 24 and enables the latter to pivot. The apparatus and load start to rise. Lanyard 3, which was not detached beforehand from the rock face, becomes tensioned between its attachment point (rock face) and pawl 24 and makes pawl 24 open. The latter is released and detaches lanyard 3 (see successive positions 3' in broken lines). A stop 52 securely affixed to hook 1 limits the angle of rotation of pawl 24 to a value compatible with detachment of lanyard 3. Pawl 24 then recloses under the weight of the load.

Figure 8:
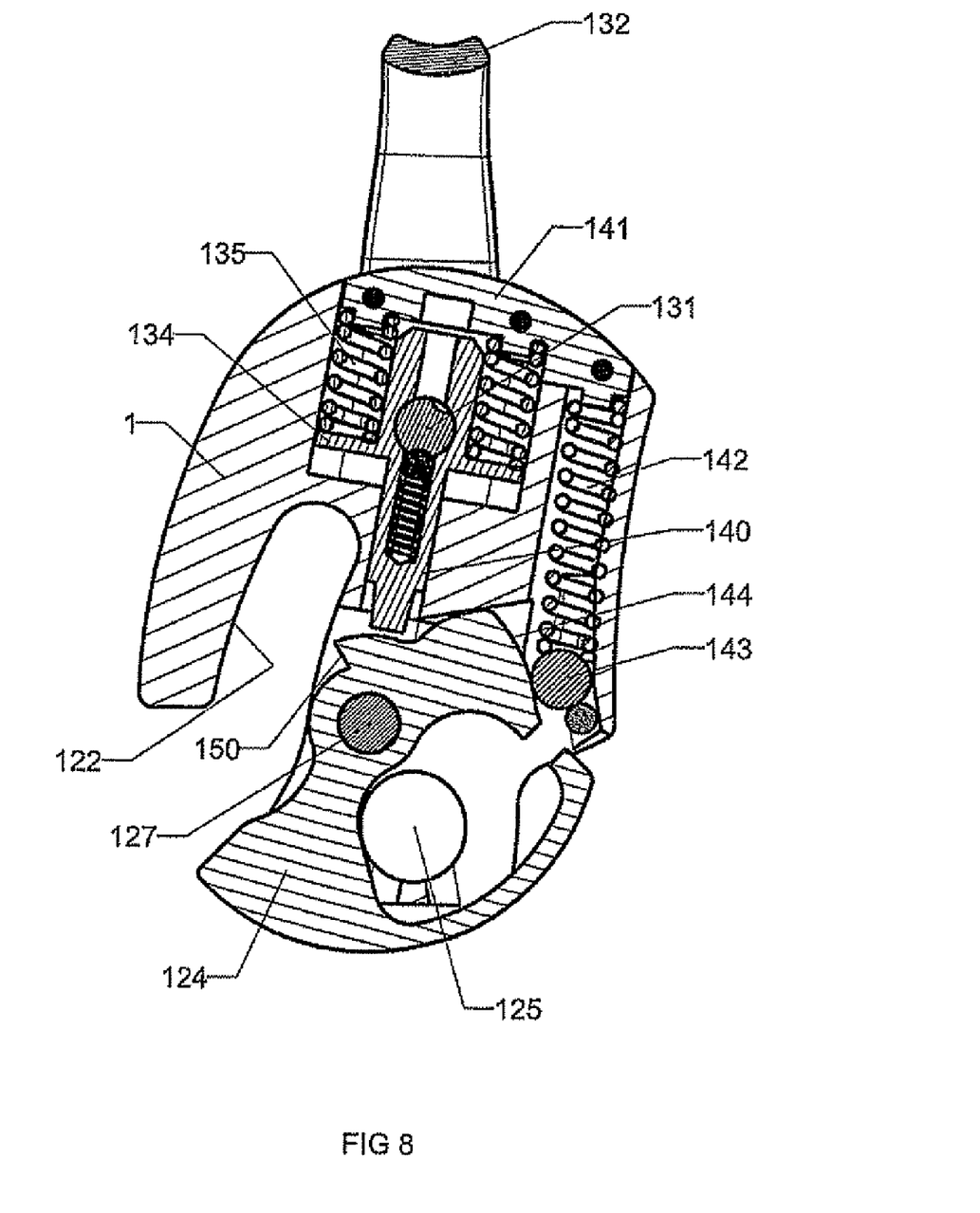
Figure 9:
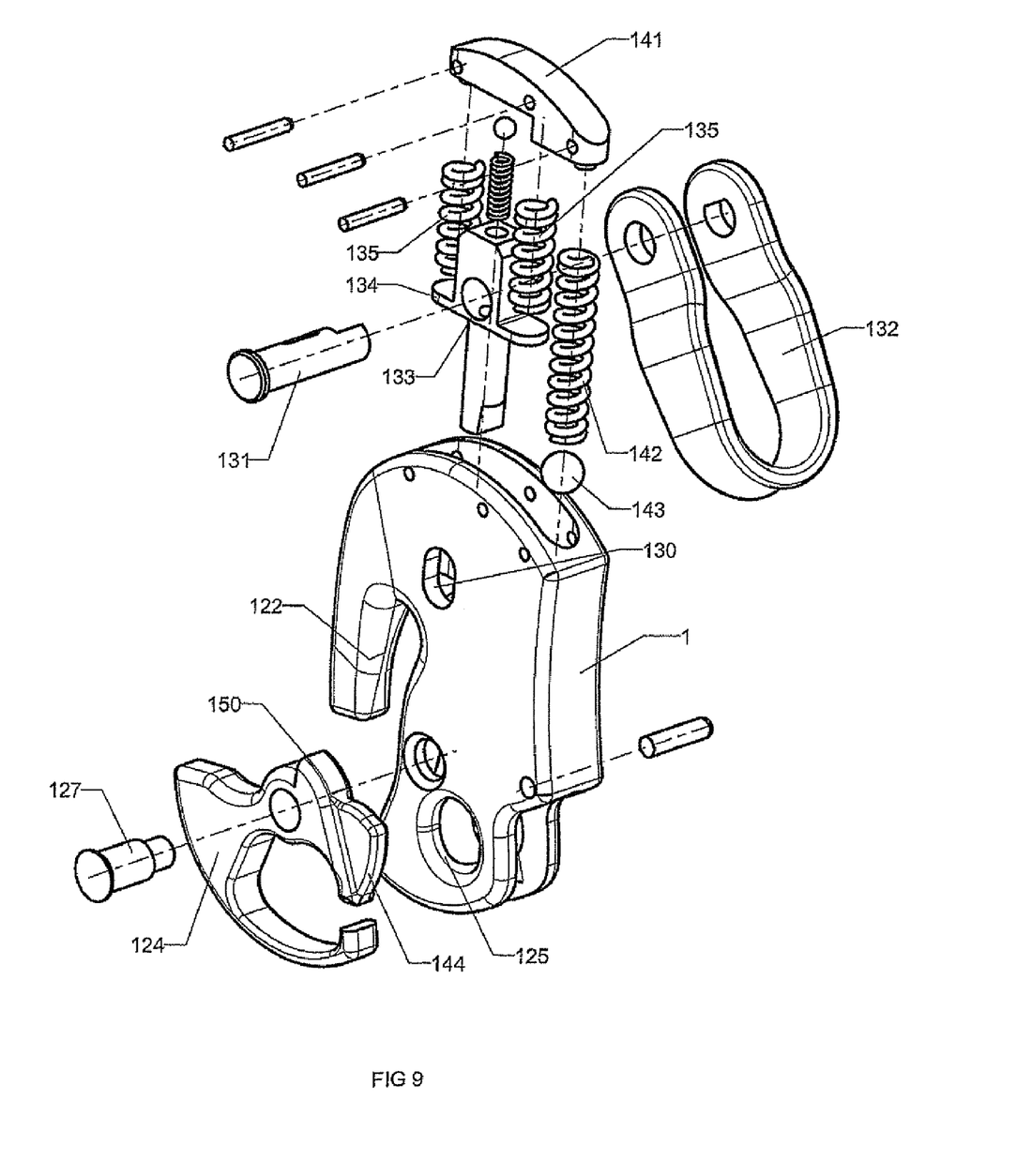
FIG. 9 is an exploded perspective view of the foregoing alternative embodiment.

With reference to FIGS. 5 to 8, the apparatus comprises a hook 1 and a pawl 124 pivoting around a spindle 127, occupying a closed position (FIGS. 5 to 7) and an open position (FIG. 8). In the closed position, the belay lanyard (not shown) is held captive in aperture 122 following pawl 124 coming into engagement against body 1.

Body 1 is provided with a circular first hole 125 for the attachment means of the load, and a second hole 130 for fitting spindle 131 of a clamp 132 forming the first attachment means to the hoisting cable of the helicopter.

Spindle 131 is housed in a slide rack 133 commanding a latch V3 formed by the bottom end of a rod 140 of slide rack 133, and a protuberance 150 of pawl 124. Slide rack 133 is provided with a cross-bar 134 subjected to the action of two compression springs 135 bearing on a fixed stop 141. In the rest state, springs 135 bias latch V3 to the latched position in contact with protuberance 150.

Figure 5:
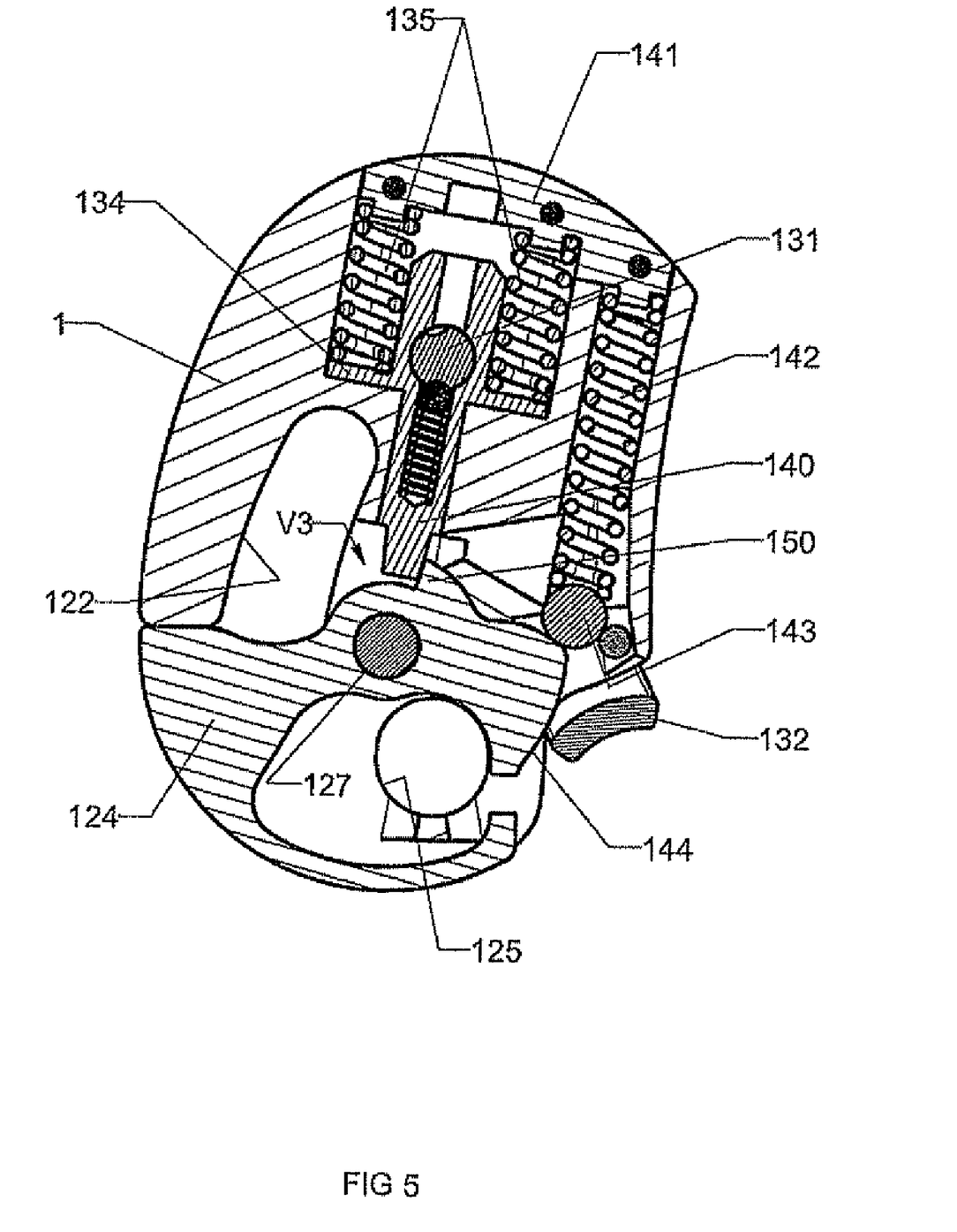
FIGS. 5 to 8 show cross-sectional views of another alternative embodiment of the apparatus according to the invention, from the stowed rest position to the detachment position.
Figure 6:
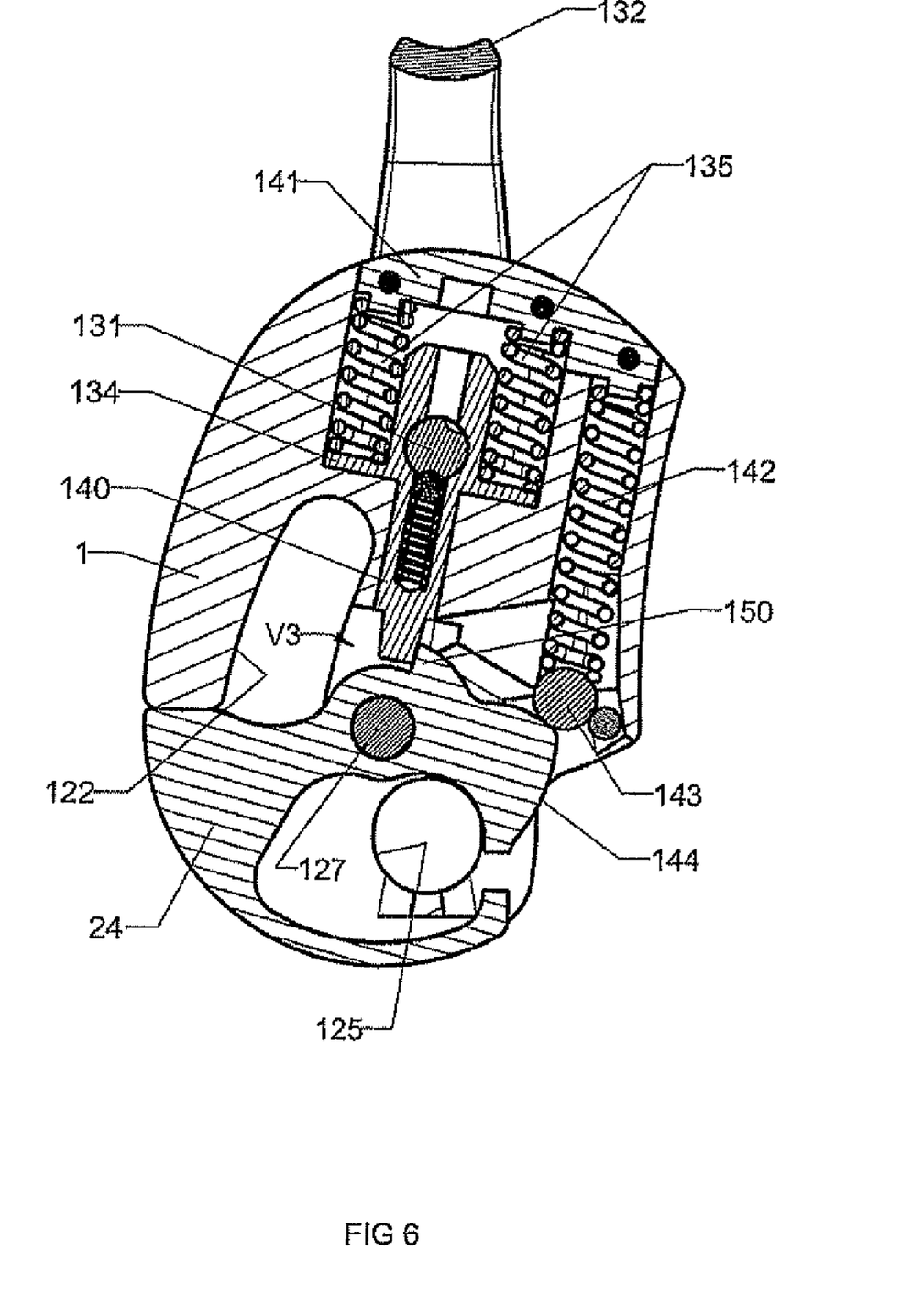
Figure 7:
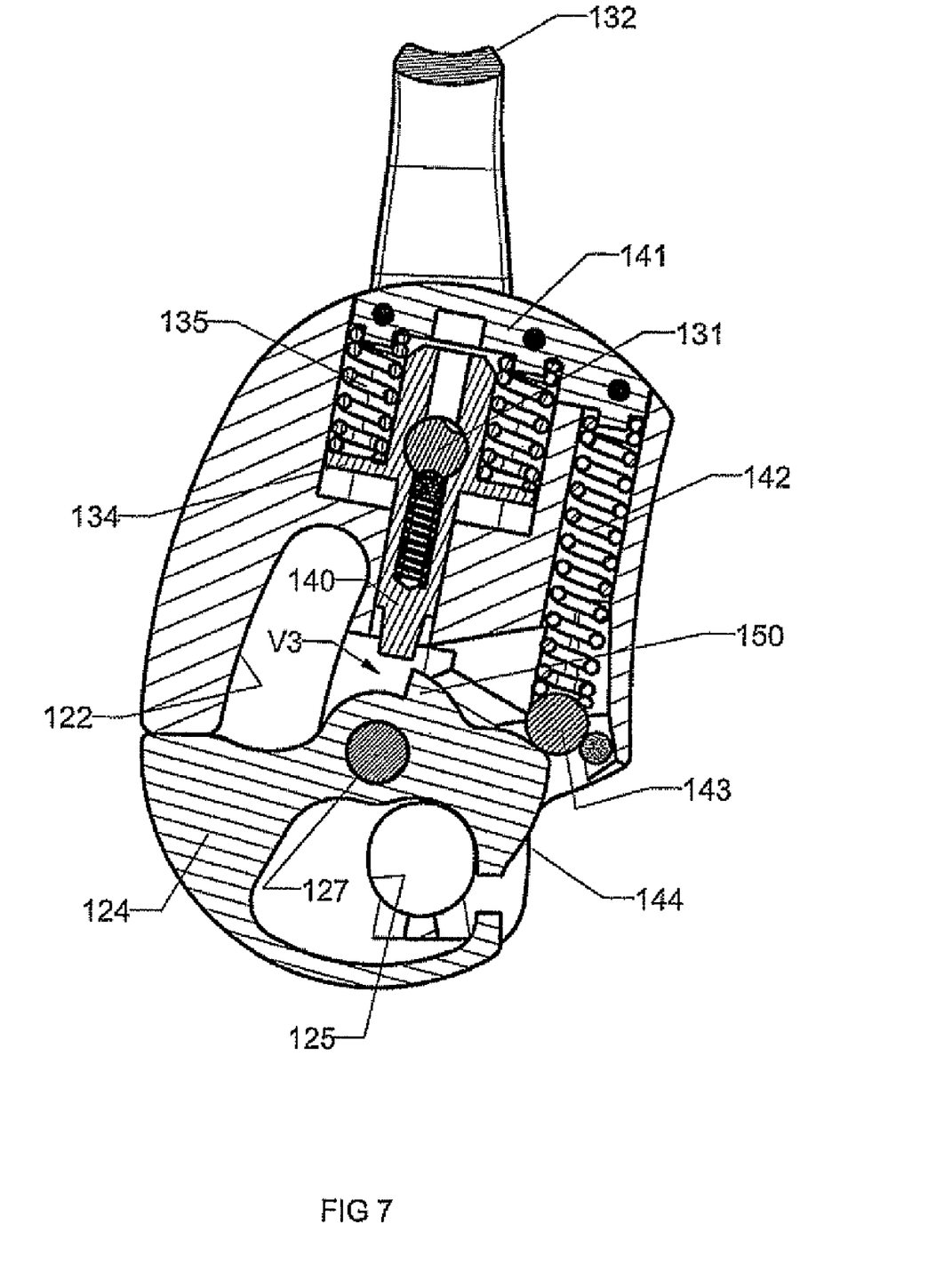

An auxiliary spring 142 is inserted in body 1 between a lateral extension of stop 141 and a ball-bearing 143 pressing on pawl 124. Ball-bearing 143 operates in conjunction with a convex guide ramp 144 to keep pawl 124 in the closed position (FIGS. 5 and 6). After latch V3 has been released (FIGS. 7 and 8), auxiliary spring 142 does not oppose pivoting of pawl 123 to the open position due to ball-bearing 143 running along ramp 144.

The invention claimed is:

1. An apparatus for securing rescue operations performed by helihoisting, the apparatus comprising:
    a hook having first attachment means to a cable of a helicopter;
    second attachment means for a load;
    third attachment means for a belay lanyard housed in a downward-facing aperture; and
    a control mechanism designed to trigger automatic release of the belay lanyard that has remained attached when tensioning by traction of the helicopter cable exceeds a predetermined threshold, the control mechanism including:
        a mobile pawl mounted pivotally on the hook between the closed and released positions of said aperture to respectively maintain the lanyard in the hook and to release the latter therefrom, and
        a latch submitted to the action of a polarisation spring to latch said pawl in the closed position in the absence of tension on the first attachment means, and to unlatch said pawl when the force exerted on the first attachment means exceeds that of the polarisation spring,
    wherein the second attachment means for the load are formed by a hole arranged in the pawl, the hook comprising a curved oblong aperture centred on a pivoting spindle of the pawl.

2. The apparatus for securing according to claim 1, wherein the latch comprises a guide tube joined to the first attachment means and designed to move in a straight oblong aperture of the body.

3. The apparatus for securing according to claim 2, wherein the guide tube is associated with a spring biasing the latch to a latched position.

4. The apparatus for securing according to claim 1, wherein the pawl is connected to the second attachment means by a link with an eccentric which supports the second attachment means, and through which a pivoting spindle of the pawl passes.

5. The apparatus for securing according to claim 1, wherein the pawl comprises a protuberance operating in conjunction, in a latched position of the latch, with a mechanical link securely affixed to the first attachment means.

6. The apparatus for securing according to claim 1, wherein the hook comprises:
    a circular first hole for the second attachment means of the load;
    a second hole for fitting a spindle of a pivoting clamp constituting the first attachment means to the hoisting cable of the helicopter; and
    a slide rack commanding the latch, which is formed by the bottom end of a rod of the slide rack, and a protuberance of the pawl.

7. The apparatus for securing according to claim 6, wherein the slide rack is provided with a cross-bar subjected to the action of two compression springs bearing on a fixed stop of the body.

8. The apparatus for securing according to claim 7, wherein an auxiliary spring is inserted inside the body between a lateral extension of the stop and a ball-bearing pressing against the pawl, said ball-bearing operating in conjunction with a convex guide ramp to keep the pawl in the closed position without hampering triggering.

* * * * *